US008341253B2

(12) United States Patent
Choi

(10) Patent No.: US 8,341,253 B2
(45) Date of Patent: Dec. 25, 2012

(54) METHOD FOR PERFORMING SUPL BASED LOCATION SERVICE

(75) Inventor: Jae-Hyuk Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 12/682,878

(22) PCT Filed: Aug. 18, 2008

(86) PCT No.: PCT/KR2008/004778
§ 371 (c)(1),
(2), (4) Date: Apr. 13, 2010

(87) PCT Pub. No.: WO2009/051334
PCT Pub. Date: Apr. 23, 2009

(65) Prior Publication Data
US 2010/0228846 A1  Sep. 9, 2010

Related U.S. Application Data

(60) Provisional application No. 60/980,114, filed on Oct. 15, 2007.

(30) Foreign Application Priority Data

Dec. 10, 2007  (KR) .................. 10-2007-0127804

(51) Int. Cl.
*G06F 15/173* (2006.01)

(52) U.S. Cl. ........ 709/223; 709/203; 709/225; 709/230; 455/456.1; 455/456.3; 379/76; 379/266.01; 340/539.13

(58) Field of Classification Search ............... 709/223, 709/203, 225, 230; 455/456.1, 456.3; 379/76, 379/266.01; 340/539.13
See application file for complete search history.

(56) References Cited

U.S. PATENT DOCUMENTS

| | | | |
|---|---|---|---|
| 6,654,447 B1 * | 11/2003 | Dewan | 379/76 |
| 7,729,706 B2 * | 6/2010 | Kim et al. | 455/456.1 |
| 8,081,749 B1 * | 12/2011 | Shaffer et al. | 379/266.01 |
| 2005/0250516 A1 * | 11/2005 | Shim | 455/456.1 |
| 2007/0082681 A1 * | 4/2007 | Kim et al. | 455/456.1 |
| 2007/0082682 A1 * | 4/2007 | Kim et al. | 455/456.1 |
| 2007/0182547 A1 * | 8/2007 | Wachter et al. | 340/539.13 |
| 2008/0174491 A1 * | 7/2008 | Kim et al. | 342/450 |
| 2010/0203902 A1 * | 8/2010 | Wachter et al. | 455/456.3 |
| 2010/0228846 A1 * | 9/2010 | Choi | 709/223 |

FOREIGN PATENT DOCUMENTS

| | | |
|---|---|---|
| EP | 1 773 024 A1 | 4/2007 |
| JP | 2007-109232 A | 4/2007 |
| KR | 10-2005-0101112 A | 10/2005 |
| KR | 10-2007-0019501 A | 2/2007 |

OTHER PUBLICATIONS

Open Mobile Alliance, "Secure User Plane Location Architecture", v1.0, Jun. 15, 2007).*

* cited by examiner

*Primary Examiner* — Yves Dalencourt
*Assistant Examiner* — Michael C Lai
(74) *Attorney, Agent, or Firm* — Birch, Stewart, Kolasch & Birch, LLP

(57) ABSTRACT

A method for performing an SUPL-based triggered location service, comprising: sending a pause message for a triggered session to a server, starting the triggered session for a triggered location service with the server; and sending a end message to the server if a condition added to the triggered session is satisfied during pause of the triggered session.

20 Claims, 5 Drawing Sheets

METHOD FOR PERFORMING SUPL BASED LOCATION SERVICE

This Non-Provisional application is the National Phase of PCT/KR2008/004778 filed on Aug. 18, 2008, which claims priority under 35 U.S.C. 119(e) to U.S. Provisional Application No. 60/980,114 filed on Oct. 15, 2007 and under 35 U.S.C. 119(a) to Patent Application No. 10-2007-0127804 filed in Korea on Dec. 10, 2007, all of which are hereby expressly incorporated by reference into the present application.

TECHNICAL FIELD

The present invention relates to a location service, and more particularly, to a method for preventing error occurrence due to pause of a triggered session in an SUPL based Triggered Location Service.

BACKGROUND ART

Generally, in a mobile communications system, a function unit for calculating a location of a terminal is provided at a mobile communications network, and a location service is provided such that a location of a terminal is sent to an entity periodically or according to a request.

A network structure relating to the location service depends on an inner network structure such as 3GPP or 3GPP2. There are many techniques for calculating a current location of a terminal, for example, a cell-ID technique to send an ID of a cell to which the terminal belongs, another technique to measure time when electric wave is sent to each base station adjacent to the terminal and then to calculate a location of the terminal by using a triangulation, a Global Positioning System (GPS) technique, and the like.

In order to provide the location service to a user, a lot of signals and location information have to be sent between a terminal and a location server. Accordingly, positioning technologies for providing a location service, i.e., a location service based on a location of a mobile terminal is being widely spread. These techniques may be provided by a user plane, and a control plane. A technique to provide a location service through the user plane is referred to as Secure User Plane Location (SUPL). The SUPL is an effective method to send, to a network, location information required to calculate a location of a mobile station, and serves to send location assistance information such as GPS assistance. Also, in the SUPL method, a user plane data bearer is used so as to transfer position technology related protocols between a mobile terminal and a network.

Generally, an SUPL network relating to a location service in a location information system includes an SUPL Agent, an SUPL Location Platform (SLP), and SUPL Enabled Terminal (SET), and so on. The SUPL Agent is a logic access point for using substantially measured location information, and the SLP is an access point of a network that accesses network resources so as to obtain location information. And, the SET is a terminal that can communicate with an SUPL network using an SUPL interface, and interworks with the SUPL network through a user plane bearer thereby to support procedures defined by the SLP. Here, the SET may be implemented as one of User Terminal (UE) of UMTS, Mobile Station (MS) of GSM, a Laptop Computer having a SET function therein, and Personal Digital Assistants (PDA). Also, the SET may be implemented as various mobile terminals connected to a network through Wideband LAN (WLAN).

In a location information service, a network registered by a user is referred to as a 'Home Network', and a network corresponding to a region to which the user moved is referred to as a 'Visited Network'. Accordingly, an SLP inside the Home Network is referred to as an 'Home-SLP(H-SLP), and an SLP inside the visited network is referred to as a 'Visited-SLP(V-SLP).

When an SUPL procedure is started in a network of the location information system, an SLP to which an external client firstly accesses is referred to as 'a Requesting-SLP(R-SLP)'. The R-SLP serving as a logic entity may be or may not be identical with an H-SLP. And, a SET situated in a location to be targeted is referred to as a Target SET.

The SLP serves as a network element and includes an SUPL Positioning Center (SPC) to substantially calculate a location of a terminal, and an SUPL Location Center (SLC) to execute other functions rather than the calculation of location information. Here, the SLC executes roaming, resource management, and so on.

The location information system may be implemented in a proxy mode in which a SET communicates with an SPC through the SLC for calculating location information of the SET, and in a non-proxy mode in which a SET is directly connected to the SPC for calculating location information of the SET.

A triggered location service in an SUPL indicates providing location information of a target SET whenever a specific condition occurs. The triggered location service includes a Periodic Triggered service for periodically providing location information of the target SET, and an Area Event triggered service for providing location information of the target SET whenever a specific event occurs.

In the conventional triggered location service, once a triggered session is initiated, the triggered session is continuously performed unless an area event occurs, or a service duration time is expired, or the triggered session is forcibly ended. That is, once a triggered session is initiated, the triggered session is continuously performed for a long time.

However, as the target SET is under a specific circumstance, it may be difficult for the target SET to maintain the triggered session currently being executed. Also, a user may want pause of the triggered session for his or her privacy protection. In this case, the triggered session being currently performed is unintentionally ended, although a requester for the triggered location service doesn't desire it. Here, the service requester has to again request a triggered location service from a network (network that performs a triggered location service). This causes inconvenience to a service requester (user), and causes consumption of resources of a network.

In order to solve these problems, has been proposed a method for pausing an initiated triggered session, which will be explained in more detail with reference to FIG. 1.

FIG. 1 is an exemplary view showing a session pause procedure in a triggered location service in accordance with the conventional art.

Referring to FIG. 1, a target SET 30 sends a pause request message for pausing a triggered session being currently performed, which will be explained in more detail.

Firstly, a triggered location service is being currently performed (S11). An SUPL Agent 10 is receiving location information of the target SET 30. Here, the SUPL Agent 10 is an entity mounted to a terminal (source terminal) and executing an SUPL-related function.

When the target SET 30 wants to pause the triggered session being currently performed, the target SET 30 sends a pause request message to an H-SLP 20 (S12). The H-SLP 20 is an SUPL server of a Home Network to which the SUPL Agent 10 is connected.

Then, the H-SLP 20 informs the pause request to the SUPL Agent 10, and receives a response about the pause request (S13).

That is, the target SET 30 may pause the triggered session being currently performed through the conventional session pause procedure.

However, the conventional session pause procedure has the following problems.

For instance, when establishing a triggered session, a condition may be added to the triggered session. Due to the added condition, the triggered session may not be started again.

More concretely, in the case that the added condition corresponds to a time condition, when time for the triggered session is over (S14), the H-SLP 20 determines that the triggered session has ended, thereby deleting all Information relating the triggered session (S15).

However, since the target SET 30 does not notice the ending of the triggered session, the target SET 30 requests the triggered session again (S16). This causes an error occurrence (S17).

Furthermore, since the target SET 30 does not notice the ending of the triggered session, the target SET 30 unnecessarily continues to maintain information about the triggered session. This causes resources waste.

DISCLOSURE OF THE INVENTION

Therefore, it is an object of the present invention to prevent error occurrence by preventing pause of a triggered session.

Another object of the present invention is to prevent resources waste by preventing pause of a triggered session.

To achieve these and other advantages and in accordance with the purpose of the present invention, as embodied and broadly described herein, there is provided a method for performing an SUPL-based triggered location service, comprising: receiving a pause message for a triggered session from a target terminal, after starting the triggered session for a triggered location service with the target terminal; and sending a end message for the triggered session to the target terminal, if a condition added to the triggered session, is satisfied during pause of the triggered session.

According to another aspect of the present invention, there is provided a method for performing an SUPL-based triggered location service, comprising: sending a pause message for a triggered session to the server, after starting the triggered session for a triggered location service with a server; receiving a end message for the triggered session indicating ending of the triggered session from the server, during pause of the triggered session; and deleting information relating to the triggered session, in response to the received end message.

According to still another aspect of the present invention, there is provided a method for performing an SUPL-based triggered location service, comprising: sending a pause message for a triggered session to a server, starting the triggered session for a triggered location service with the server; and sending a end message to the server if a condition added to the triggered session is satisfied during pause of the triggered session.

In the present invention, error occurrence is prevented by compensating for a procedure of Triggered Session Pause.

In the present invention, network resources and terminal resources are prevented from being wasted by compensating for a procedure of Triggered Session Pause.

MODES FOR CARRYING OUT THE PREFERRED EMBODIMENTS

Reference will now be made in detail to the preferred embodiments of the present invention, examples of which are illustrated in the accompanying drawings.

Hereinafter, a method for performing an SUPL-based triggered location service according to the present invention will be explained in more detail with reference to the attached drawings.

The present invention is to solve error occurrence due to pause of a triggered session for an SUPL-based triggered location service in an SUPL-based location information system. In the present invention, ending of a triggered session being performed is informed by using a dedicated message or a common message, and specific parameters indicating ending of the triggered session.

Preferred embodiments of the present invention are categorized according to whether starting a triggered session for a triggered location service is requested by an entity or a SET inside a network. Also, the preferred embodiments of the present invention are categorized according to whether a condition added to the triggered session has been acknowledged by a target SET or a server.

In first and second preferred embodiments, it is an entity inside a network, i.e., an SUPL Agent that requests starting of a triggered session for an SUPL-based triggered location service. On the contrary, in third and fourth preferred embodiments, it is a SET that requests starting of a triggered session for an SUPL-based triggered location service.

An SUPL Agent 100 serving as an entity to execute an SUPL-related function may be a portable device that can perform communication, such as a portable phone, Personal Digital Assistants (PDA), a smart phone, and a notebook computer. The SUPL Agent 100 may be a device that can perform communication but can not be carried, such as a desktop PC. A target SUPL Enabled Terminal (SET) 300 may be one of a User Terminal (UE) of UMTS, Mobile Station (MS) of GSM, Personal Digital Assistants (PDA) provided with a SET function, and notebook computer. Also, the target SET may be one of various mobile terminals connected to a network through Wideband LAN (WLAN).

Figure 1:
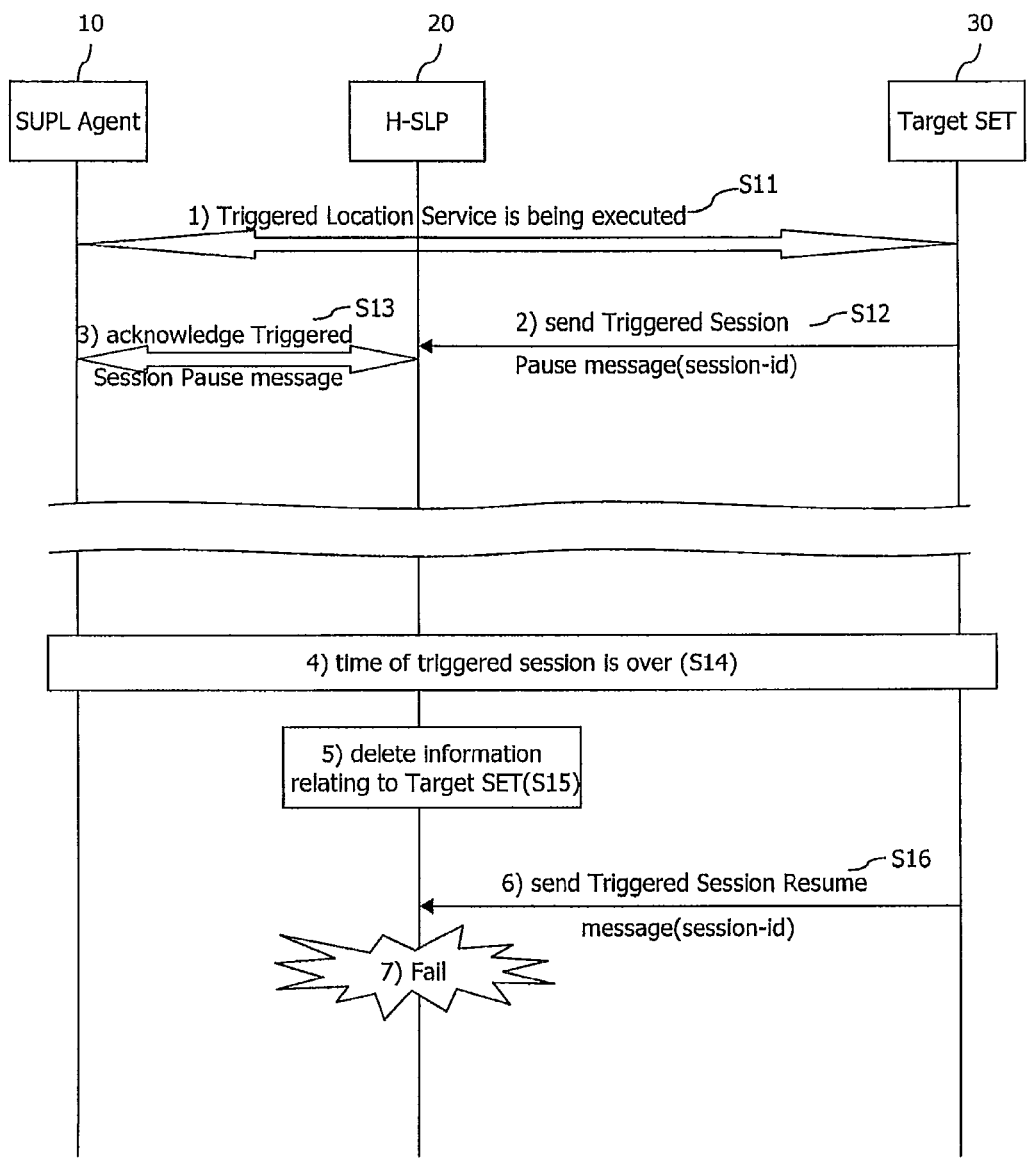
FIG. 1 is an exemplary view showing a session pause procedure in a triggered location service in accordance with the conventional art.
Figure 2:
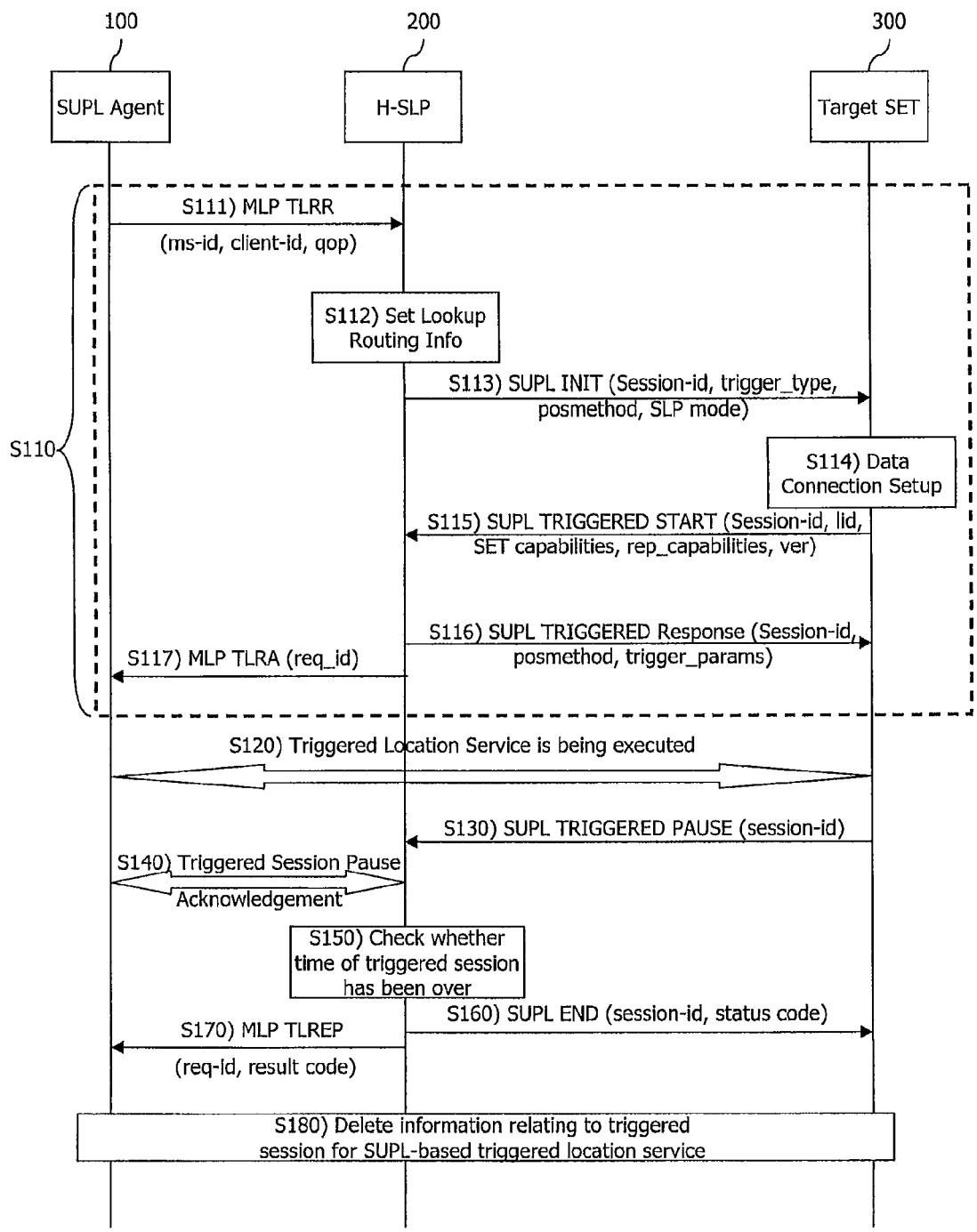
FIG. 2 is a flowchart showing an error processing method in a triggered session according to a first embodiment of the present invention.

FIG. 2 is a flowchart showing an error processing method in a triggered session according to a first embodiment of the present invention.

Referring to FIG. 2, in the first embodiment of the present invention, an entity inside a network, e.g. the SUPL Agent 100 requests starting of a triggered session for an SUPL-based triggered location service. Therefore, an H-SLP 200 is an SUPL server of a home network to which the SUPL Agent 100 is connected. However, the H-SLP 200 may be an SUPL server of a home network to which the target SET 300 is connected.

Referring to FIG. 2, in the first embodiment of the present invention, it is an SLP, e.g., an H-SLP that checks whether a condition added to a triggered session for an SUPL-based triggered location service has been satisfied, e.g., whether a time condition has expired. If the condition has been satisfied, the SLP, e.g., the H-SLP informs ending of the triggered session to the target SET. This will be explained in more detail.

1) As the SUPL Agent 100 (or source terminal/device) requests an SUPL-based triggered location service from the H-SLP 200, a triggered session for the SUPL-based triggered location service is started between the H-SLP 200 and the target SET 300 (S110). Here, the SUPL Agent 100 may add a condition to the triggered session for the SUPL-based triggered location service. For instance, when the requested service is a Periodic Triggered service to periodically provide location information of the target SET, a time condition may be added to the triggered session. More concretely, a start time, a period, and the number of measurments for the triggered session may be set. Otherwise, a start time and a stop time for the triggered service may be set. Once a time condition is added to the triggered session, the triggered session is valid for the set time. On the contrary, when the set time lapses, the triggered session is ended.

S110 will be explained in more detail. Detailed explanation about functions and operations of parameters included in messages that will be described with respect to S110, and detailed explanation about a triggered location service will be based on contents disclosed in a standard document of OMA-SUPL-TS-ULP-V2.0-20070927-D.

The SUPL Agent 100 sends a triggered session request message for a SUPL-based triggered location service, e.g., an MLP TLRR message, to the H-SLP 200 so as to request location information of the target SET 300 (S111). The MLP TLRR message includes parameters such as ms-id, client-id, qop, and condition. The ms-id is a parameter (element) including identification (ID) information of the target SET 300. The condition is a parameter added to the triggered session. The condition parameter may be a start time parameter and a period parameter. Alternatively, the condition parameter may be a start time parameter and a stop time parameter. Other types of parameters including a time condition and other conditions may be variously implemented.

Once receiving the MLP TLRR message, the H-SLP 200 authenticates the SUPL Agent 100, and authenticates whether the SUPL Agent 100 can request the triggered service. The H-SLP 200 checks a subscriber information of the target SET 300 based on the ms-id received in S111.

The H-SLP 200 determines that the target SET 300 is not in an SUPL-roaming status by searching routing information of the target SET 300, and so on (S112). Here, S112 is applied only to a non-roaming service.

The H-SLP 200 starts an SUPL-based triggered location service by sending an SUPL INIT message to the target SET 300 (S113). Here, the SUPL INIT message may be a WAP PUSH trigger or an SMS trigger. The SUPL INIT message includes parameters such as session-id, trigger_type=area event, posmethod, and SLP mode.

The target SET 300 receives the SUPL INIT message, thereby being connected to a packet network (S114).

Then, the target SET 300 sends, to the H-SLP 200, a message indicating start of a triggered session for the SUPL-based triggered location service, i.e., an SUPL TRIGGERED START message (S151). The SUPL TRIGGERED START message includes parameters such as session-id, SET-capability indicating a capability of the target SET 300, and location identifier (lid) indicating specific cells of a mobile communication network. The SET capability parameter includes information about a location measuring method such as SET-Assisted A-GPS or SET-Based A-GPS, and information about related location measuring protocols such as RRLP, RRC, and TIA-801.

Then, the H-SLP 200 receives the SUPL TRIGGERED START message, and selects a location measuring method to be used to a local event triggered session base on information included in the received message. Then, the H-SLP 200 sends an SUPL TRIGGERED RESPONSE message to the target SET 300 (S116). Here, the SUPL TRIGGERED RESPONSE message includes triggered parameters ('trigger_params' of FIG. 2) as well as a session-id parameter and a posmethod parameter.

When a setting of the triggered session is completed, the H-SLP 200 sends an MLP TLRA message to the SUPL Agent 100, thereby informing acknowledgement of the SUPL-based triggered location service requested in S111 (S117). Here, the MLP TLRA message includes a 'req id' parameter. The 'req id' parameter is used as a 'transaction id' during an overall period of the triggered session for an SUPL-based triggered location service.

2) Once the setting of the triggered session has been completed, an SUPL-based triggered location service is executed (S120).

3) Then, if the target SET 300 wants pause of the triggered session for an SUPL-based triggered location service, for example, for privacy protection, the target SET 300 sends a pause request message to the H-SLP 200. Here, the pause request message may be an SUPL TRIGGERED PAUSE message. The pause request message includes a 'session-id' parameter. The 'session-id' parameter includes a value to identify the target SET 300 (i.e., ID of the target SET), and a value to identify the H-SLP 200 (i.e., ID of the H-SLP). And, when multi sessions are simultaneously executed between the H-SLP 200 and the target SET 300, the 'session-id' parameter serves as information to identify the multi sessions from each other.

4) The H-SLP 200 informs, to the SUPL Agent 100, that the triggered session being performed has been paused by the target SET 300 by using a triggered session pause message (S140). Here, the triggered session pause message may be a Triggered Session Pause Acknowledgement message. The Triggered Session Acknowledgement message may include the session-id parameter.

5) The H-SLP 200 checks whether a condition added to the triggered session has been satisfied. For instance, when the triggered session is provided with a time condition added thereto, the H-SLP 200 may check whether the time condition has been satisfied. More concretely, when a start time parameter and a period parameter are used, a stop time is analogized based on the start time and the period. And, it may be checked whether the present time corresponds to the stop time. As aforementioned, when a start time parameter and a stop time parameter are used, it may be checked whether the present time corresponds to the stop time through the stop time parameter. Here, whether the time condition has been satisfied may be checked through other types of methods. Also, whether other conditions rather than the time condition have been satisfied may be checked.

6) If it is determined that the added condition has been satisfied, e.g., when the present time corresponds to the stop time, the H-SLP 200 sends a triggered session end message to the target SET 300. Here, the triggered session end message may be an SUPL END message. The triggered session end message includes a 'session-id' parameter and a 'status code' parameter. The 'status code' parameter may be a parameter indicating that the present time corresponds to the condition. For instance, the 'status code' parameter may be a status value indicating that time of the triggered session has exceeded.

7) Then, the H-SLP 200 informs, to the SUPL Agent 100, through an MLP TLREP message, that the triggered session has been ended (S170). Here, the MLP TLREP message includes a 'req-id' parameter and a 'result code' parameter. The 'result code' parameter may indicate that the present time has corresponded to the condition, e.g., time of the triggered session has exceeded.

8) Then, the H-SLP 200 deletes information about the triggered session, i.e., triggered session Information (S180). That is, the H-SLP 200 deletes information such as session-id, trigger_type, posmethod, and trigger_params.

The target SET 300 having received the triggered session end message also deletes the triggered session information. The SUPL Agent 100 also deletes the triggered session information.

According to the first embodiment of the present invention, the target SET can recognize that the triggered session has ended. As a result, the target SET 300 does not request the triggered session again, and thus error occurrence is prevented. Furthermore, since the SUPL Agent 100, the H-SLP 200, and the target SET 300 can recognize that the triggered session has ended, information about the triggered session is deleted and waste of resources is prevented.

Figure 3:
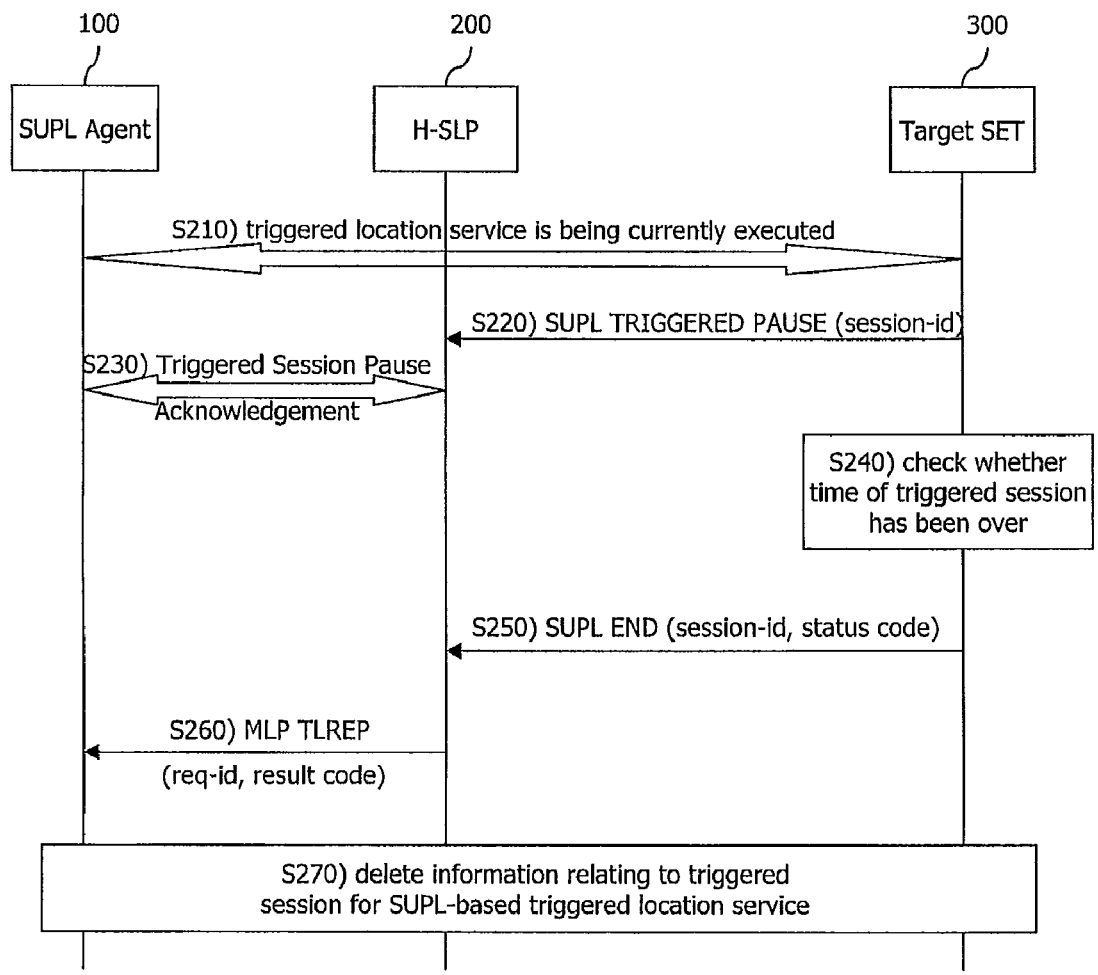
FIG. 3 is a flowchart showing an error processing method in a triggered session according to a second embodiment of the present invention.

FIG. 3 is a flowchart showing an error processing method in a triggered session according to a second embodiment of the present invention;

Referring to FIG. 3, in the second embodiment of the present invention, an entity inside a network, e.g. the SUPL Agent 100 requests starting of a triggered session for an SUPL-based triggered location service, in the same manner as the first embodiment. Therefore, an H-SLP 200 is an SUPL server of a home network to which the SUPL Agent 100 is connected.

In the second embodiment of the present invention, it is the target SET 300 that checks whether a condition added to a triggered session for an SUPL-based triggered location service has been satisfied, e.g., whether a time condition has expired (S240).

If it is determined that the condition has been satisfied, the target SET 300 sends the aforementioned triggered session end message, to an SLP, e.g., the H-SLP 200 (S250). Then, the H-SLP 200 informs, to the SUPL Agent 100, through an MLP TLREP message, that the triggered session has been ended (S260). Then, the H-SLP 200, the SUPL Agent 100, and the target SET 300 delete information relating to the triggered session, i. e, triggered session information (S270).

Details of the second embodiment, more concretely, details relating to messages to be sent/received and details about whether the condition has been satisfied are the same as those of the first embodiment. Accordingly, the details of the second embodiment will not be explained, but will be substituted by those of the first embodiment.

Figure 4:
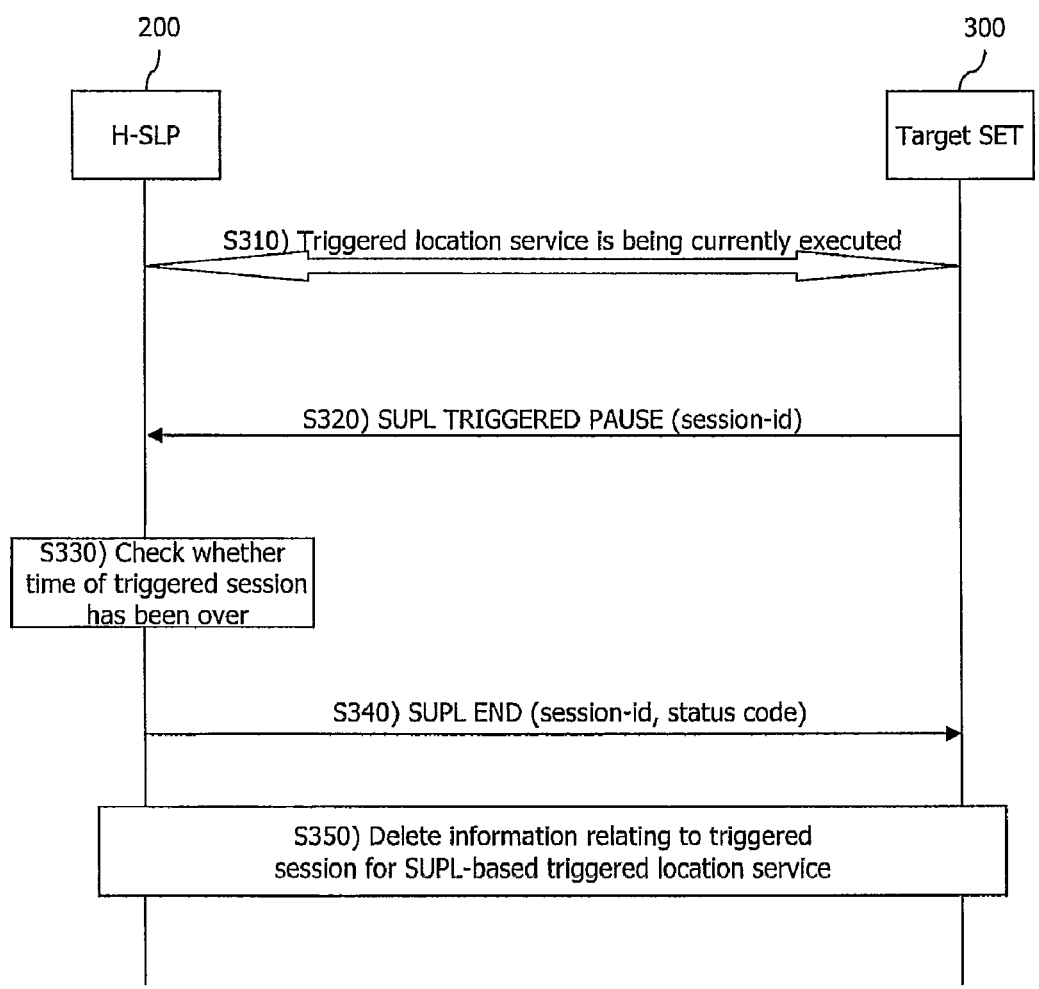
FIG. 4 is a flowchart showing an error processing method in a triggered session according to a third embodiment of the present invention.

FIG. 4 is a flowchart showing an error processing method in a triggered session according to a third embodiment of the present invention.

Referring to FIG. 4, in the third embodiment of the present invention, the target SET 300 requests starting of a triggered session for an SUPL-based triggered location service. Therefore, the H-SLP 200 is an SUPL server of a home network to which the target SET 300 is connected.

In the third embodiment of the present invention, it is the H-SLP 200 that checks whether a condition added to a triggered session for an SUPL-based triggered location service has been satisfied, e.g., whether a time condition has been satisfied (S330). And, once it is determined that the condition has been satisfied, the server, e.g., the H-SLP 200 sends the aforementioned triggered session end message, to the target SET 300 (S340).

Details of the third embodiment, more concretely, details relating to messages to be sent/received and details about whether the condition has been satisfied are the same as those of the first embodiment. Accordingly, the details of the third embodiment will not be explained, but will be substituted by those of the first embodiment.

Figure 5:
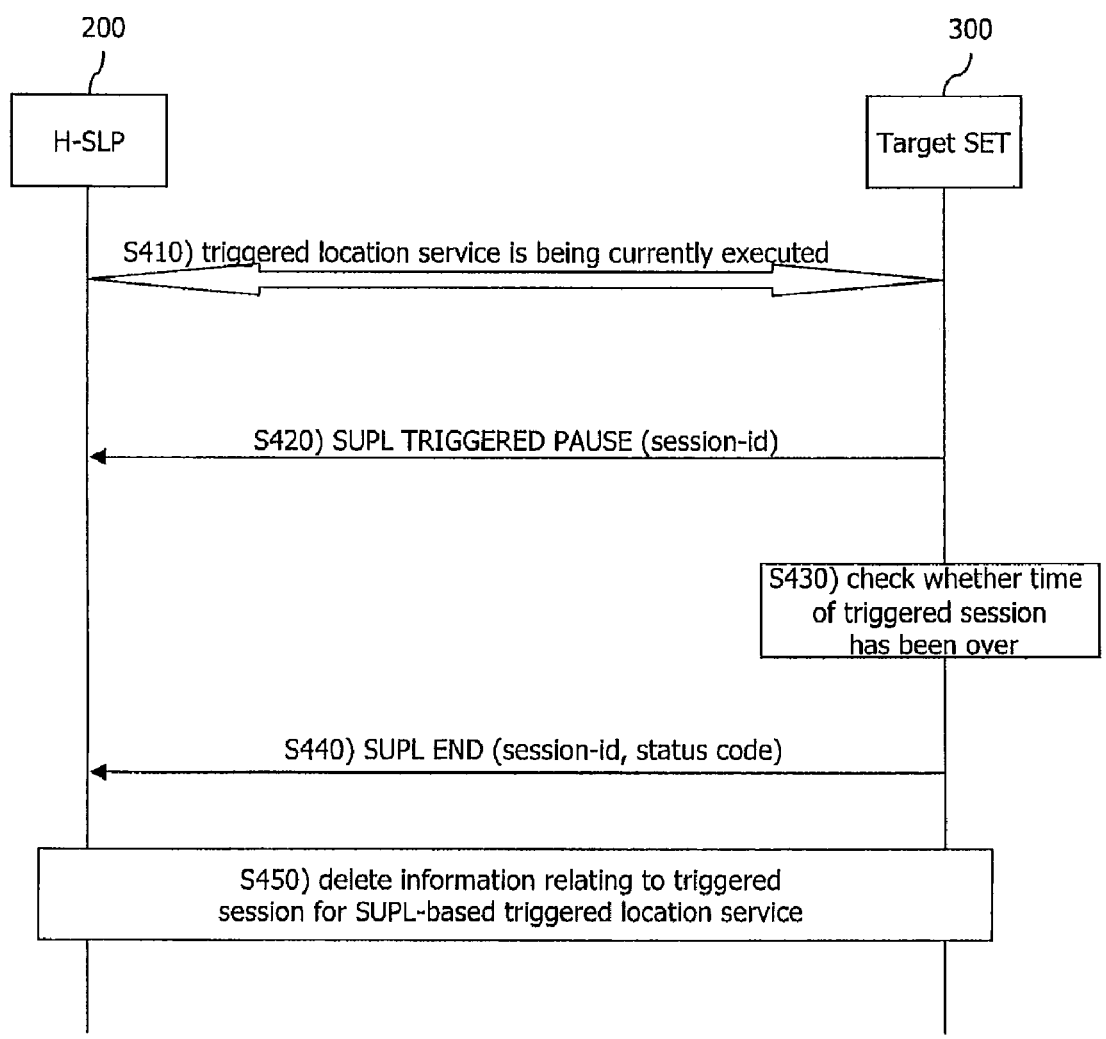
FIG. 5 is a flowchart showing an error processing method in a triggered session according to a fourth embodiment of the present invention.

FIG. 5 is a flowchart showing an error processing method in a triggered session according to a fourth embodiment of the present invention.

Referring to FIG. 5, in the fourth embodiment, it is the target SET 300 that requests starting of a triggered session in the same manner as the third embodiment of FIG. 4

In the fourth embodiment, the target SET 300 checks whether a condition added to a triggered session for an SUPL-based triggered location service has been satisfied, e.g., whether a time condition has been satisfied (S430). Also, once it is determined that the condition has been satisfied, a server, e.g., the target SET 300 sends the aforementioned triggered session end message, to a server, e.g., the H-SLP 200 (S440).

Details of the fourth embodiment, more concretely, details relating to messages to be sent/received and details about whether the condition has been satisfied are the same as those of the first embodiment. Accordingly, the details of the fourth embodiment will not be explained, but will be substituted by those of the first embodiment.

The method of the present invention may be implemented by software or hardware, or by combinations thereof. That is, the method of the present invention may be implemented as an apparatus. For instance, the method of the present invention may be executed by being stored in a storage medium (e.g., inner memory of a terminal, flash memory, hard disk, etc.), or by being loaded from the storage medium by a controller (e.g., inner processor of a terminal).

Hereinafter, a terminal to which the method of the present invention has been applied, i.e., an SUPL enabled terminal (SET: source SET or target SET) will be explained in more detail.

The terminal of the present invention indicates a terminal capable of executing an SUPL-based triggered location service. And, the terminal includes basic software and hardware configurations, as well as an SUPL Agent that executes an SUPL service.

The terminal of the present invention comprises a transceiver configured to send or receive a triggered session end message indicating that a triggered session has ended as a condition added to the triggered session has been satisfied; and an SUPL Agent configured to check whether the condition added to the triggered session has been satisfied, and then to send the triggered session end message through the transceiver, or to receive a triggered session message through the transceiver. The SUPL Agent may be referred to as a controller. Explanations about operations of the respective components may be substituted by those of FIGS. 2 to 5.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for performing a Secure User Plane Location based (SUPL-based) triggered location service, comprising:
   receiving, by a server from a target SUPL Enabled Terminal (SET), a pause message for a triggered session for the SUPL-based triggered location service, after starting the triggered session with the target SET to provide a location service;
   pausing the triggered session based on the pause message; and
   sending, by the server, a triggered session end message for the triggered session to the target SET, if a condition added to the triggered session is satisfied while the triggered session is paused,
   wherein the triggered session end message for the triggered session is a SUPL END message.

2. The method of claim 1, further comprising:
   before the receiving step, receiving a triggered session request message including the condition so as to start the triggered session.

3. The method of claim 1, further comprising:
   obtaining location information of the target SET through the triggered session.

4. The method of claim 1, wherein the condition is a time condition about the triggered session.

5. The method of claim 1, wherein the condition includes a start time of the triggered session, the number of location measurements and a location measuring period.

6. The method of claim 5, wherein the condition is determined to be satisfied, by analyzing a stop time of the triggered session based on the start time of the triggered session, the number of the location measurements, and the location measuring period, and by checking whether a present time corresponds to the stop time.

7. The method of claim 1, wherein the condition includes a start time and a stop time of the triggered session.

8. The method of claim 1, wherein the triggered session end message for the triggered session comprises at least one of a session-id parameter, and a status code parameter.

9. The method of claim 1, further comprising sending a message to a SUPL agent that has requested the start of the triggered session, said message indicating status information regarding the condition.

10. A method for performing a Secure User Plane Location based (SUPL-based) triggered location service, comprising:
    sending, by a target SUPL Enabled Terminal (SET) to a server, a pause message for a triggered session for the SUPL-based triggered location service, after starting the triggered session with the server to provide a location service;
    while the triggered session is paused based on the pause message, receiving, by the target SET, a triggered session end message for the triggered session indicating ending of the triggered session from the server; and
    deleting information relating to the triggered session in response to the received triggered session end message,
    wherein the triggered session end message is a SUPL END message.

11. The method of claim 10, wherein the triggered session end message for the triggered session comprises at least one of a session-id parameter and a status code parameter.

12. The method of claim 10, wherein the information relating to the triggered session comprises at least one of 'session-id', 'trigger_type', 'posmethod', and 'trigger_params'.

13. A method for performing a Secure User Plane Location based (SUPL-based) triggered location service, comprising:
    establishing a triggered session for the SUPL-based triggered location service with a server to provide a location service;
    sending, by a target SUPL Enabled Terminal (SET) to the server, a pause message for the established triggered session;
    while the triggered session is paused based on the pause message, determining, by the target SET, whether a condition added to the triggered session is satisfied; and
    sending, by the target SET to the server, a triggered session end message for the paused session when the condition added to the triggered session has been satisfied,
    wherein the triggered session end message is a SUPL END message.

14. The method of claim 13, wherein the condition is included in a triggered session request message to initiate the triggered session.

15. The method of claim 14, wherein the triggered session request message is an SUPL INIT message.

16. The method of claim 13, wherein the condition is a time condition about the triggered session.

17. The method of claim 13, wherein the condition includes a start time of the triggered session, the number of location measurements, and a location measuring period.

18. The method of claim 17, wherein the determining step includes:
    analyzing a stop time of the triggered session based on the start time of the triggered session, the number of the location measurements, and the location measuring period; and
    checking whether a present time corresponds to the stop time.

19. The method of claim 13, wherein the condition includes a start time and an end time of the triggered session.

20. The method of claim 13, wherein the triggered session end message comprises at least one of a session-id parameter and a status code parameter.

* * * * *